United States Patent
Tomomatsu et al.

(10) Patent No.: US 9,377,986 B2
(45) Date of Patent: Jun. 28, 2016

(54) IMAGE FORMING APPARATUS

(71) Applicant: Brother Kogyo Kabushiki Kaisha, Nagoya-shi, Aichi-ken (JP)

(72) Inventors: Yoshitsugu Tomomatsu, Nagoya (JP); Michihiro Uto, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/658,277

(22) Filed: Mar. 16, 2015

(65) Prior Publication Data

US 2015/0331648 A1 Nov. 19, 2015

(30) Foreign Application Priority Data

May 19, 2014 (JP) ................ 2014-103207

(51) Int. Cl.
- G06F 3/12 (2006.01)
- G06K 15/00 (2006.01)
- G06K 15/02 (2006.01)

(52) U.S. Cl.
CPC ............ *G06F 3/1292* (2013.01); *G06F 3/1236* (2013.01); *G06F 3/1258* (2013.01); *G06K 15/021* (2013.01); *G06K 15/4045* (2013.01)

(58) Field of Classification Search
None
See application file for complete search history.

(56) References Cited

U.S. PATENT DOCUMENTS

| | | | | |
|---|---|---|---|---|
| 8,542,370 B2* | 9/2013 | Ikeura | ............... | H04N 1/00965 358/1.13 |
| 8,934,107 B2* | 1/2015 | Tsujimoto | .......... | H04N 1/00244 358/1.13 |
| 2009/0036056 A1* | 2/2009 | Oshima | ............... | H04M 1/7253 455/41.3 |
| 2012/0307268 A1* | 12/2012 | Miller | ...................... | H04N 1/56 358/1.9 |
| 2013/0094047 A1* | 4/2013 | Bailey | .................... | H04L 63/18 358/1.14 |
| 2014/0240776 A1* | 8/2014 | Suzuki | .................. | G06F 3/1296 358/1.15 |
| 2015/0002892 A1* | 1/2015 | Maeda | ............... | H04N 1/32539 358/1.15 |
| 2015/0146243 A1* | 5/2015 | Tsujimoto | ............. | G06F 3/1207 358/1.15 |
| 2015/0189025 A1* | 7/2015 | Banno | .................. | G06F 3/1204 709/224 |

FOREIGN PATENT DOCUMENTS

JP 2014-002682 A 1/2014

* cited by examiner

*Primary Examiner* — Dung Tran
(74) *Attorney, Agent, or Firm* — Banner & Witcoff, Ltd.

(57) ABSTRACT

A storage portion stores information, which can be obtained from an image forming apparatus by a communication terminal, as a result of wireless communication with the communication terminal via a first communication portion. The processor stores setting information, the information set in the communication terminal to perform communication with the communication terminal via a second communication portion, in the storage portion. The processor stores application information, the information that can identify an application which is executed by the communication terminal in accordance with a state of the image forming apparatus, in the storage portion. The processor receives the data transmitted from the communication terminal in accordance with the application being executed in the communication terminal as a result of wireless communication, via the second communication portion, with the communication terminal in which the setting information stored in the storage portion by the first storing is set.

5 Claims, 7 Drawing Sheets

| CASS TYPE | TAPE TYPE | TAPE WD | APPLICATION INFO |
|---|---|---|---|
| 001 | LAMINATED | 6 | T. !android.com: pkgcom.brother.ptouch. iprintandLabel1. |
| 002 | | 12 | |
| 003 | | 18 | |
| 011 | NON-LAM | 6 | T. !android.com: pkgcom.brother.ptouch. iprintandLabel2. |
| 012 | | 12 | |
| 013 | | 18 | |
| 021 | FLEXIBLE | 6 | T. !android.com: pkgcom.brother.ptouch. cableLabel. |
| 022 | | 12 | |
| 023 | | 18 | |

| ADDRESS | 00 | 01 | 02 | 03 | 04 | 05 | 06 | 07 | 08 | 09 | 0A | 0B | 0C | 0D | 0E | 0F | 0123456789ABCDEF |
|---|---|---|---|---|---|---|---|---|---|---|---|---|---|---|---|---|---|
| 00000000 | 10 | 01 | 01 | 00 | 14 | 00 | 00 | 00 | 00 | 00 | 01 | 00 | 00 | 5F | 00 | 86 | |
| 00000010 | 91 | 01 | 28 | 55 | 00 | 63 | 6F | 6D | 2E | 62 | 72 | 6F | 74 | 68 | 65 | 72 | . (U.com.brother |
| 00000020 | 2E | 70 | 6E | 73 | 3A | 2F | 2F | 70 | 72 | 6E | 2F | 73 | 74 | 73 | 2F | 6E | .pns://prn/sts/p |
| 00000030 | 61 | 3F | 6D | 3D | 50 | 54 | 2D | 50 | 37 | 35 | 30 | 57 | 54 | 0F | 21 | 61 | A?m=PT-P750W !a |
| 00000040 | 6E | 64 | 72 | 6F | 69 | 64 | 2E | 63 | 6F | 6D | 3A | 70 | 6B | 67 | 63 | 6F | ndroid.com:pkgco |
| 00000050 | 6D | 2E | 62 | 72 | 6F | 74 | 68 | 65 | 72 | 2E | 70 | 74 | 6F | 75 | 63 | 68 | m.brother.ptouch |
| 00000060 | 2E | 69 | 70 | 72 | 69 | 6E | 74 | 61 | 6E | 64 | 4C | 61 | 62 | 65 | 6C | 00 | .iprintandLabel |
| 00000070 | 00 | 00 | 00 | 00 | 00 | 00 | 00 | 00 | 00 | 00 | 00 | 00 | 00 | 00 | 00 | 00 | |
| 00000080 | 00 | 00 | 00 | 00 | 00 | 00 | 00 | 00 | 00 | 00 | 00 | 00 | 00 | 00 | 00 | 00 | |
| 00000090 | 00 | 00 | 00 | 00 | 00 | 00 | 00 | 00 | 00 | 00 | 00 | 00 | 00 | 00 | 00 | 00 | |
| 000000A0 | 00 | 00 | 00 | 00 | 00 | 00 | 00 | 00 | 00 | 00 | 00 | 00 | 00 | 00 | 00 | 00 | |
| 000000B0 | 00 | 00 | 00 | 00 | 00 | 00 | 00 | 00 | 00 | 00 | 00 | 00 | 00 | 00 | 00 | 00 | |
| 000000C0 | 00 | 00 | 00 | 00 | 00 | 00 | 00 | 00 | 00 | 00 | 00 | 00 | 00 | 00 | 00 | 00 | |

| CASS TYPE | TAPE TYPE | TAPE WD | APPLICATION INFO |
|---|---|---|---|
| 001 | LAMINATED | 6 | T.!android.com: pkgcom.brother.ptouch. iprintandLabel1. |
| 002 | | 12 | |
| 003 | | 18 | |
| 011 | NON-LAM | 6 | T.!android.com: pkgcom.brother.ptouch. iprintandLabel2. |
| 012 | | 12 | |
| 013 | | 18 | |
| 021 | FLEXIBLE | 6 | T.!android.com: pkgcom.brother.ptouch. cableLabel. |
| 022 | | 12 | |
| 023 | | 18 | |

IMAGE FORMING APPARATUS

CROSS-REFERENCE TO RELATED APPLICATION

This application claims priority to Japanese Patent Application No. 2014-103207 filed on May 19, 2014, the disclosure of which is herein incorporated by reference in its entirety.

BACKGROUND

The present disclosure relates to an image forming apparatus.

An image forming apparatus provided with Near Field Communication (NFC) functions has been proposed. A plurality of functions provided by NFC include a card emulation function. As a known technology, a technology has been disclosed, for example, by which a user terminal causes an in-store smartphone to read a coupon identification (ID) using the NFC card emulation function.

SUMMARY

Processing relating to image formation may be performed in the following manner, for example. First, a communication terminal executes an application. This application outputs, to an image forming apparatus, data that are used to cause the image forming apparatus to perform image formation. The image forming apparatus performs the processing relating to the image formation based on the data output from the communication terminal in accordance with the application being executed.

When the above-described known technology is applied to the image forming apparatus, the image forming apparatus can notify the communication terminal of IDs, etc. using the NFC card emulation function. However, the image forming apparatus cannot notify the communication terminal regarding an application corresponding to a state of the image forming apparatus. In this case, the communication terminal faces a problem in which the communication terminal cannot execute the appropriate application corresponding to the state of the image forming apparatus.

Various exemplary embodiments of the general principles described herein provide an image forming apparatus capable of causing a communication terminal to execute an appropriate application corresponding to a state of the image forming apparatus.

Embodiments herein provide an image forming apparatus capable of wireless communication with a communication terminal. The image forming apparatus includes a first communication portion, a second communication portion, a storage portion, an image forming portion, and a processor. The first communication portion is configured to perform wireless communication based on a first standard included in short-range wireless communication standards. The second communication portion is configured to perform wireless communication based on a second standard, which is different from the first standard. The storage portion is provided to store information, which can be obtained from the image forming apparatus by the communication terminal, as a result of wireless communication being performed with the communication terminal via the first communication portion. The image forming portion is provided to perform processing relating to image formation based on data transmitted from the communication terminal to the image forming apparatus.

The processor is configured to perform first storing that stores setting information in the storage portion. The setting information is the information set in the communication terminal to perform communication with the communication terminal via the second communication portion. The processor is configured to perform second storing that stores application information in the storage portion. The application information is the information that can identify an application which is executed by the communication terminal in accordance with a state of the image forming apparatus. The processor is configured to receive the data transmitted from the communication terminal in accordance with the application being executed in the communication terminal as a result of wireless communication, via the second communication portion, with the communication terminal in which the setting information stored in the storage portion by the first storing is set.

BRIEF DESCRIPTION OF THE DRAWINGS

Embodiments will be described below in detail with reference to the accompanying drawings in which:

FIG. 3 shows one example of data stored in a FeRAM 271;

DETAILED DESCRIPTION

Figure 1:
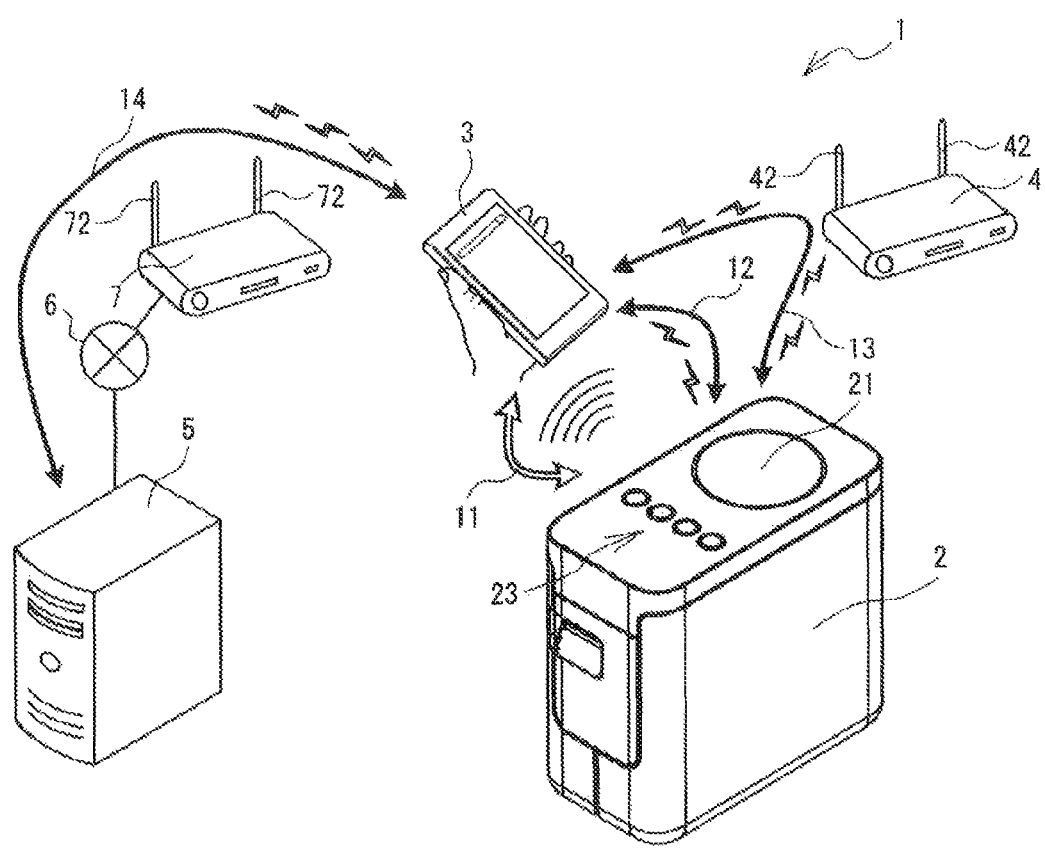
FIG. 1 is a diagram showing an overview of a printing system 1.

A printing system 1 will be described with reference to FIG. 1. The printing system 1 includes a printing device 2, a communication terminal 3, access points (hereinafter referred to as APs) 4 and 7, and a server 5.

The printing device 2 includes a first antenna 21, a second antenna 22 (refer to FIG. 2), an input portion 23, and a cassette housing portion which is not shown in the drawings. The first antenna 21 is an antenna for performing wireless communication based on the Near Field Communication (NFC) system, which is a short-range wireless communication system. The short-range wireless communication is herein defined as wireless communication having a longest communicable distance shorter than that of a wireless local area network (LAN). The short-range wireless communication is also referred to as a wireless personal area network (a wireless PAN). Besides the NFC system, the short-range wireless communication systems include radio frequency identification (RFID), TransferJet (registered trademark), Bluetooth (registered trademark), etc. The second antenna 22 is an antenna for performing wireless communication based on the wireless LAN system. The input portion 23 is provided with four push buttons. The cassette housing portion can house one of a plurality of known tape cassettes, having different tape types and tape widths, respectively. Specific examples of the tape types include a laminated tape, a non-laminated tape, a high-function tape (including a tape being manufactured by Brother Industries, Ltd. and having a product name of "Flexible ID Tape"), etc. The tape widths may be 6 mm, 12 mm, or 18 mm, for example.

The printing device 2 pulls out a tape from a tape cassette housed in the cassette housing portion. The printing device 2 heats an ink ribbon using a thermal head 241 (refer to FIG. 2) and performs printing on the tape. When a tape cassette, in which a laminated tape is used as the tape type, is housed in the cassette housing portion, the printing device 2 performs printing on the tape, and thereafter, adheres a cover film onto the tape. The printing device 2 cuts a printed section of the tape from the tape. In the above-described manner, the printing device 2 can create a label.

The printing device 2 performs the above-described printing processing based on print data. The print data are created by the communication terminal 3 (to be described below) in accordance with an application (hereinafter referred to as a printing application) that is executed by the communication terminal 3 in order to create and edit the print data. The printing device 2 obtains the print data from the communication terminal 3. Note that it is preferable that the print data be created and edited by the printing application corresponding to the type (i.e. a combination of the tape type and the tape width) of the tape cassette housed in the cassette housing portion. This is because the printing device 2 uses different print data to appropriately execute the printing processing depending on the tape type and the tape width of the tape cassette. Thus, it is preferable that the printing application corresponding to the type of the tape cassette housed in the cassette housing portion be executed by the communication terminal 3 so as to create the print data.

The communication terminal 3 is a known smartphone. The communication terminal 3 can execute the printing application. A user can cause the communication terminal 3 to execute the printing application and create the print data. Then, the user can cause the printing device 2 to perform printing based on the print data and create the label. The communication terminal 3 includes a first antenna 31 (refer to FIG. 2) and a second antenna 32 (refer to FIG. 2). The first antenna 31 is an antenna for performing wireless communication based on the NFC system. The second antenna 32 is an antenna for performing wireless communication based on the wireless LAN system.

Each of the APs 4 and 7 is a wireless LAN base unit. The AP 4 includes a second antenna 42. The AP 7 includes a second antenna 72. Each of the second antennas 42 and 72 is an antenna for performing wireless communication based on the wireless LAN system. The server 5 is a database server. The server 5 stores a plurality of installation files of the printing applications that can be executed by the communication terminal 3. Each of the plurality of printing applications, which can be installed on the communication terminal 3 using the plurality of installation files, can create and edit the print data. The AP 7 and the server 5 are connected to a wired network 6.

The printing device 2 and the communication terminal 3 can directly transmit and receive data to and from each other by performing wireless communication based on the NFC system (an arrow 11) and the wireless LAN system (an arrow 12), respectively. Note that, when the wireless communication based on the wireless LAN system is directly performed between the printing device 2 and the communication terminal 3, a WiFi direct mode is used as a communication mode. Further, the printing device 2 and the communication terminal 3 can respectively perform the wireless communication with the AP 4 based on the wireless LAN communication. The printing device 2 and the communication terminal 3 can indirectly transmit and receive data to and from each other via the AP 4 (an arrow 13), respectively. Further, the communication terminal 3 and the server 5 can indirectly transmit and receive data to and from each other via the AP 7 (an arrow 14), respectively. Note that, when the wireless communication based on the wireless LAN system is performed among the printing device 2, the communication terminal 3, and the AP 4 and between the communication terminal 3 and the AP 7, a WiFi infrastructure mode is used as a communication mode.

An electrical structure of the printing device 2 will be described with reference to FIG. 2. The printing device 2 includes a control circuit 200. The control circuit 200 is formed on a control board fixed inside the printing device 2. The control circuit 200 includes a CPU 201, a ROM 202, an EEPROM 203, a RAM 204, a flash ROM 205, and an input/output interface 206. The CPU 201, the ROM 202, the EEPROM 203, the RAM 204, the flash ROM 205, and the input/output interface 206 are electrically connected to one another via a bus 207.

The CPU 201 controls the entire printing device 2. The ROM 202 stores initial parameters. The EEPROM 203 stores dot pattern data for printing that are used for printing characters, symbols, numbers, a barcode, etc. The RAM 204 stores temporary data. The flash ROM 205 stores programs for main processing (refer to FIG. 6 and FIG. 7) that can be performed by the CPU 201. The CPU 201 performs various calculations based on the programs stored in the flash ROM 205. Further, the flash ROM 205 stores a table 2051 (refer to FIG. 4), which will be described below, the print data, and the printing applications (a simplified version, hereinafter referred to as a "Lite Mode").

The input portion 23, driver circuits 24 and 25, a detection portion 26, a first communication IC 27, and a second communication IC 28 are connected to the input/output interface 206. The input portion 23 outputs information indicating a type of the button operated by the user to the input/output interface 206. The input portion 23 includes a power button, a "feed&cut" button, a wireless switch button, and an "editor lite" button. The power button switches on and off a power supply of the printing device 2. The "feed&cut" button causes the printed tape to be fed out of the printing device 2 and to be cut so as to create the label. The wireless switch button switches the communication mode of the wireless communication, which is performed by the printing device 2 based on the wireless LAN system, between the WiFi direct mode and the WiFi infrastructure mode. The "editor lite" button is used to select either to cause the communication terminal 3 to perform the printing application (the Lite mode) stored in the flash ROM 205 of the printing device 2 or to cause the communication terminal 3 to perform the printing application stored in a flash ROM 305 (to be described below) of the communication terminal 3. Note that, when the present embodiment will be described below, it will be assumed that the communication terminal 3 performs the printing application stored in the flash ROM 305.

The detection portion 26 detects the type of the tape cassette housed in the cassette housing portion. The detection portion 26 includes a displacement sensor. The displacement sensor detects whether or not there are holes provided in the tape cassette. Note that the holes are provided in the tape cassette at different positions depending on the tape type and the tape width of the tape cassette. The detection portion 26 can output a signal indicating the position of the detected holes to the input/output interface 206. The CPU 201 can identify the tape type and the tape width of the tape cassette housed in the cassette housing portion based on the signal output from the detection portion 26.

The driver circuit 24 causes an electric current to pass through a heating element of the thermal head 241. The driver circuit 25 rotationally drives motors 251 and 253. The motor 251 is connected to a platen roller 252. The platen roller 252 rotates while pressing the tape against the thermal head 241 as the motor 251 is driven rotationally. The motor 253 is connected to a press roller 254. When the tape cassette using the laminated tape as the tape type is housed in the cassette housing portion, the press roller 254 rotates while pressing the cover film against the printed tape as the motor 253 is driven rotationally.

The first communication IC 27 is a communication IC for performing the wireless communication based on the NFC system according to NFC standards. The first communication IC 27 operates in a card emulation mode in the present embodiment. The first antenna 21 is connected to the first communication IC 27. The first communication IC 27 can be driven using an induced current induced in the first antenna 21 as a power source. The first communication IC 27 includes a FeRAM 271. FIG. 3 shows one example of data stored in the FeRAM 271. The FeRAM 271 stores at least setting information (refer to 271A in FIG. 3) and application information (refer to 271B in FIG. 3). The setting information is required when the printing device 2 and the communication terminal 3 perform the wireless communication based on the wireless LAN system. The setting information includes a communication mode, an SSID, an encryption key, etc. Hereinafter, the setting information including the WiFi direct mode as the communication mode will be referred to as first setting information. The setting information including the WiFi infrastructure mode as the communication mode will be referred to as second setting information. The application information indicates a type of the printing application that is executed by the communication terminal 3.

Note that, in the present embodiment, it is assumed that the first communication IC 27 is a communication IC for performing the wireless communication based on the NFC system according to the NFC standards. However, in the present disclosure, the first communication IC 27 may perform the short-range wireless communication in accordance with other communication standards. The first communication IC 27 may perform the short-range wireless communication in accordance with RFID standards, for example.

Figure 2:
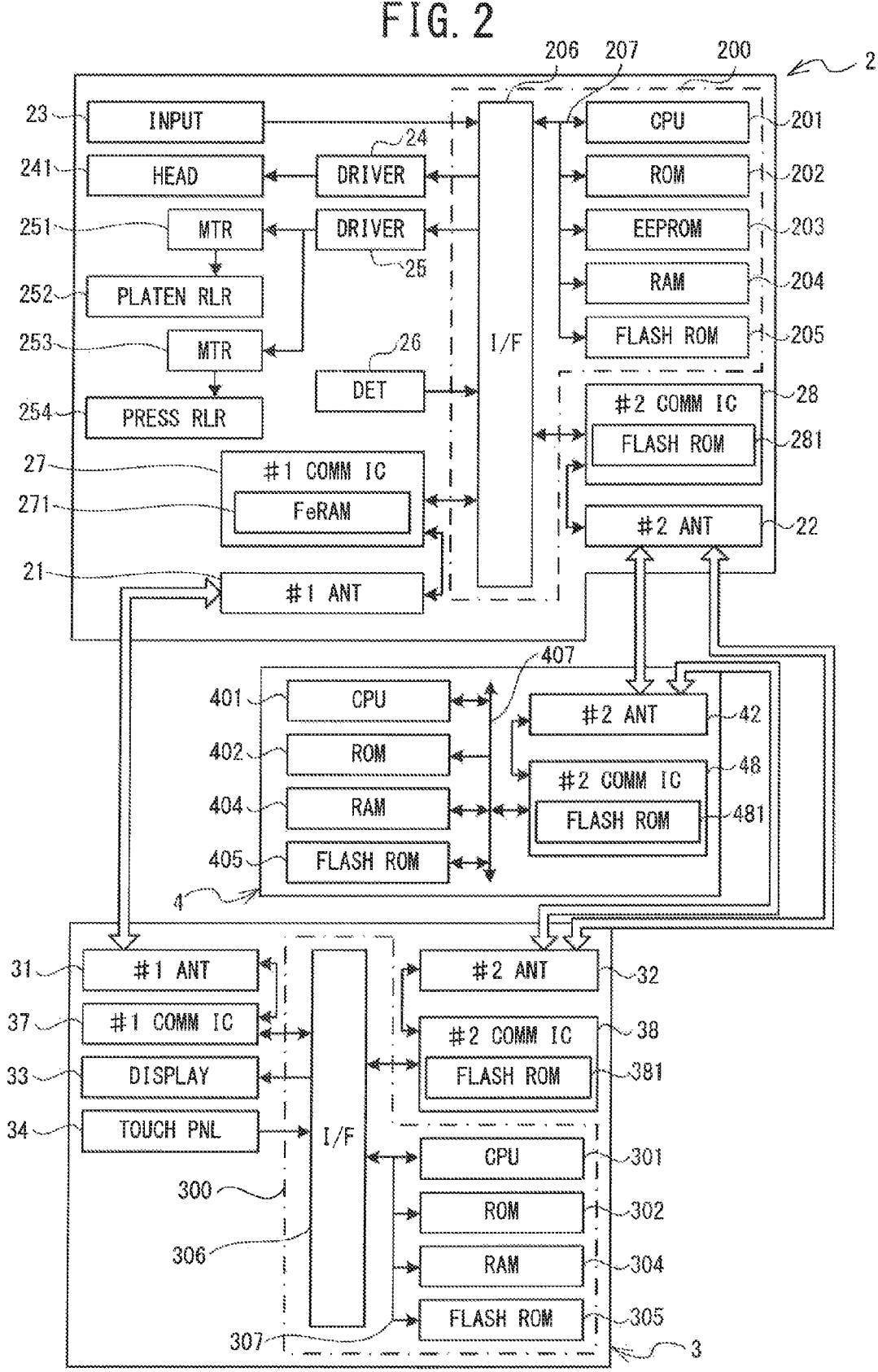
FIG. 2 is a block diagram showing an electrical structure of a printing device 2.

The second communication IC 28 is a communication IC for performing the wireless communication based on the wireless LAN system, as shown in FIG. 2. The second antenna 22 is connected to the second communication IC 28. The second communication IC 28 includes a flash ROM 281. The flash ROM 281 stores the communication mode, the first setting information, and the second setting information (for the AP 4). The communication mode indicates either the WiFi direct mode or the WiFi infrastructure mode. The first setting information is the setting information that is required when communication is performed with the communication terminal 3 in the WiFi direct mode. The second setting information (for the AP 4) is the setting information that is required when communication is performed with the AP 4 in the WiFi infrastructure mode. Note that the first setting information and the second setting information (for the AP 4) are stored in advance in the flash ROM 281 by user operation. The second communication IC 28 can perform the wireless communication based on the wireless LAN system, according to the communication mode stored in the flash ROM 281, using the first setting information and the second setting information (for the AP 4).

Figure 4:
FIG. 4 is a diagram showing a table 2051.

The table 2051 stored in the flash ROM 205 will be described with reference to FIG. 4. In the table 2051, tape types and tape widths corresponding to respective tape cassette types are associated with application information. The printing application indicated by the application information can create the print data, with which the printing device 2 can appropriately perform printing using a tape cassette of the corresponding type. Although details will be described below, the CPU 201 refers to the table 2051 to identify the application information corresponding to the tape cassette type identified via the detection portion 26.

An electrical structure of the communication terminal 3 will be described with reference to FIG. 2. The communication terminal 3 includes a control circuit 300. The control circuit 300 is formed on a control board fixed inside the communication terminal 3. The control circuit 300 includes a CPU 301, a ROM 302, a RAM 304, a flash ROM 305, and an input/output interface 306. The CPU 301, the ROM 302, the RAM 304, the flash ROM 305, and the input/output interface 306 are electrically connected to one another via a bus 307.

The CPU 301 controls the entire communication terminal 3. The ROM 302 stores initial parameters. The RAM 304 stores temporary data. The flash ROM 305 stores programs that can be executed by the CPU 301. The CPU 301 performs various calculations based on the programs stored in the flash ROM 305. Further, the flash ROM 305 stores the printing application and the print data. A display portion 33, a touch panel 34, a first communication IC 37, and a second communication IC 38 are connected to the input/output interface 306. The display portion 33 is a liquid crystal display. The touch panel 34 is provided on a front side of the display portion 33.

The first communication IC 37 is a communication IC for performing the wireless communication based on the NFC system according to the NFC standards. The first communication IC 37 operates in a reader/writer mode in the present embodiment. The first antenna 31 is connected to the first communication IC 37.

Note that, in the present embodiment, as in the case of the printing device 2, it is assumed that the first communication IC 37 is the communication IC for performing the wireless communication based on the NFC system according to the NFC standards. However, in the present disclosure, the first communication IC 37 may perform the short-range wireless communication in accordance with other communication standards. The first communication IC 37 may perform the short-range wireless communication in accordance with the same RFID standards that are used by the first communication IC 27 of the printing device 2, for example.

The second communication IC 38 is a communication IC for performing the wireless communication based on the wireless LAN system. The second antenna 32 is connected to the second communication IC 38. The second communication IC 38 includes a flash ROM 381. The flash ROM 381 stores the first setting information and the second setting information (for the AP 4). The first setting information and the second setting information (for the AP 4) are obtained from the printing device 2 and stored in the flash ROM 381 (details will be described below). Further, the flash ROM 381 stores the second setting information (for the AP 7). The second setting information (for the AP 7) is stored in advance in the flash ROM 381 by user operation. The second communication IC 38 can perform the wireless communication based on the wireless LAN system using the first setting information and the second setting information (for the AP 4 and the AP 7) stored in the flash ROM 381.

An electrical structure of the AP 4 will be described. As an electrical structure of the AP 7 is the same as that of the AP 4, an explanation of the AP 7 will be omitted. The AP 4 includes a CPU 401, a ROM 402, a RAM 404, a flash ROM 405, and a second communication IC 48. The CPU 401, the ROM 402, the RAM 404, the flash ROM 405, and the second communication IC 48 are electrically connected to one another via a bus 407. The CPU 401 controls the entire AP 4. The ROM 402 stores initial parameters. The RAM 404 stores temporary data. The flash ROM 405 stores programs that can be executed by the CPU 401. The CPU 401 performs various calculations based on the programs stored in the flash ROM 405. The second communication IC 48 is a communication IC for performing the wireless communication based on the wireless LAN system. The second antenna 42 is connected to the second communication IC 48. The second communication IC 48 includes a flash ROM 481. The flash ROM 481 stores the second setting information (for the AP 4). The second communication IC 48 can perform the wireless communication based on the wireless LAN system using the second setting information (for the AP 4) stored in the flash ROM 481.

When the respective flash ROMs 281 and 381 of the second communication ICs 28 and 38 store the same first setting information, the printing device 2 and the communication terminal 3 can perform the wireless communication based on the wireless LAN system in the WiFi direct mode. On the other hand, when the respective flash ROMs 281 and 381 of the second communication ICs 28 and 38 store the same second setting information (for the AP 4), the printing device 2 and the communication terminal 3 can perform the wireless communication with the AP 4 based on the wireless LAN system in the WiFi infrastructure mode.

Figure 5:
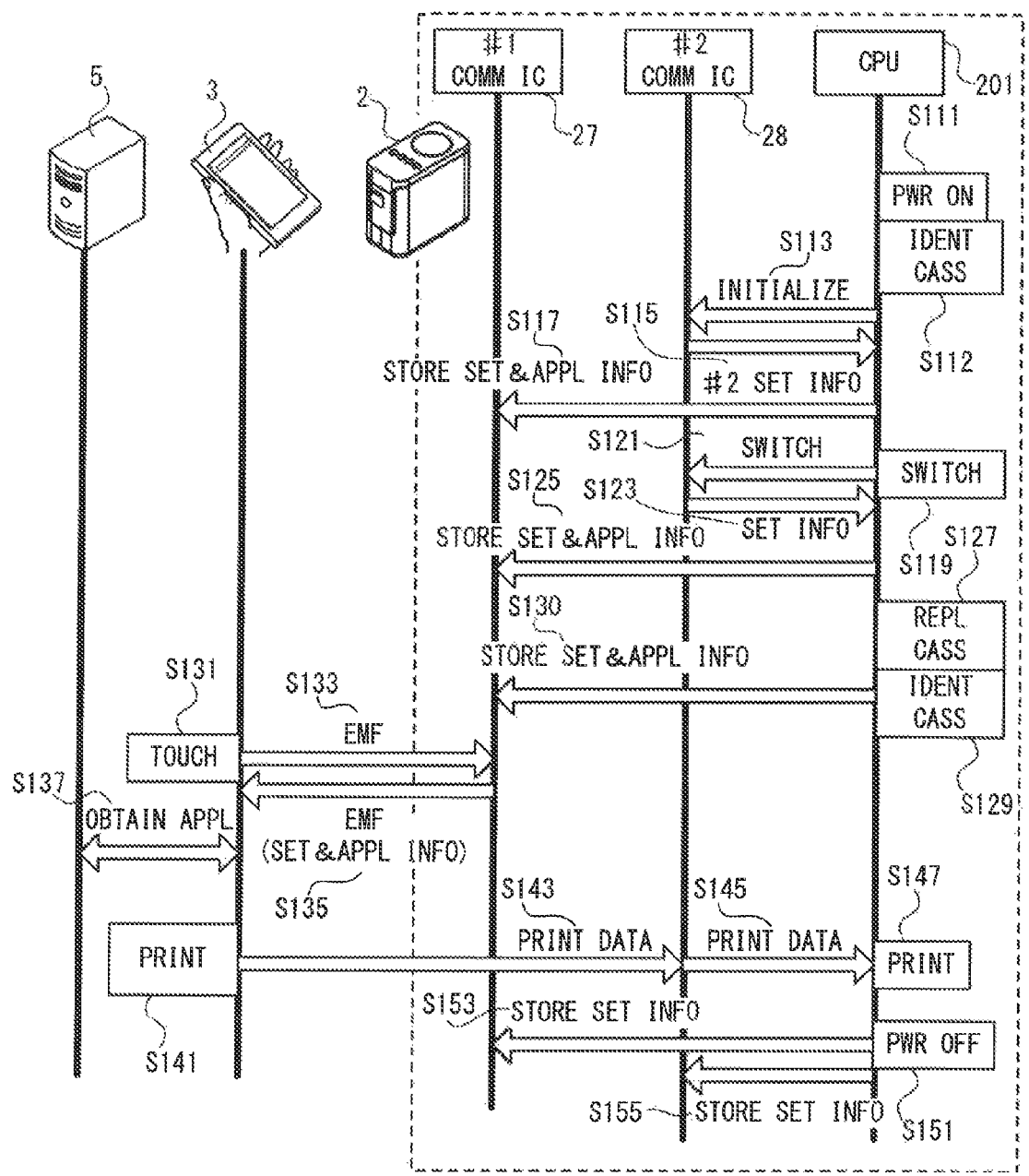
FIG. 5 is a diagram showing a communication sequence.

A communication sequence of the printing device 2, the communication terminal 3, and the server 5 will be described with reference to FIG. 5. When the power button of the input portion 23 of the printing device 2 is operated to switch on the power supply of the printing device 2 (step S111), the CPU 201 of the printing device 2 identifies the type of the tape cassette housed in the cassette housing portion via the detection portion 26 (step S112). The CPU 201 then refers to the table 2051 (refer to FIG. 4) to identify the application information corresponding to the identified type of the tape cassette.

The CPU 201 outputs an initialization command signal to the second communication IC 28 (step S113). When the second communication IC 28 detects the initialization command signal, the second communication IC 28 sets the communication mode stored in the flash ROM 281 to the WiFi infrastructure mode. The second communication IC 28 outputs a signal indicating the second setting information (for the AP 4) to the CPU 201 (step S115). The CPU 201 detects the signal indicating the second setting information (for the AP 4), the signal being output from the second communication IC 28. The CPU 201 identifies the second setting information (for the AP 4) based on the detected signal.

The CPU 201 outputs, to the first communication IC 27, signals respectively indicating the second setting information (for the AP 4), which is identified based on the signal output from the second communication IC 28, and the application information corresponding to the tape cassette type, which is identified by the processing at step S112 (step S117). When the first communication IC 27 detects the signals indicating the second setting information (for the AP 4) and the application information, the first communication IC 27 stores the second setting information (for the AP 4) and the application information in the FeRAM 271 (refer to FIG. 3).

A case in which the wireless switch button is operated on the input portion 23 of the printing device 2 (step S119) will be described as an example. In this case, the CPU 201 outputs a communication mode switch command signal to the second communication IC 28 (step S121). When the second communication IC 28 detects the communication mode switch command signal, the second communication IC 28 switches the communication mode stored in the flash ROM 281. Specifically, when the WiFi direct mode is stored in the flash ROM 281 as the communication mode, the second communication IC 28 switches the communication mode to the WiFi infrastructure mode. When the WiFi infrastructure mode is stored in the flash ROM 281 as the communication mode, the second communication IC 28 switches the communication mode to the WiFi direct mode.

The second communication IC 28 outputs, to the CPU 201, a signal indicating the setting information (the first setting information or the second setting information (for the AP 4)) corresponding to the communication mode stored in the flash ROM 281 (step S123). The CPU 201 detects the signal indicating the setting information, the signal being output from the second communication IC 28. The CPU 201 identifies the setting information based on the detected signal. The CPU 201 outputs, to the first communication IC 27, signals respectively indicating the identified setting information and the application information (step S125). When the first communication IC 27 detects the signals indicating the setting information and the application information, the first communication IC 27 stores the setting information and the application information in the FeRAM 271 (refer to FIG. 3).

A case in which the tape cassette, which is housed in the cassette housing portion of the printing device 2, is replaced (step S127) will be described as an example. In this case, the CPU 201 identifies the type of the tape cassette housed in the cassette housing portion via the detection portion 26 (step S129). The CPU 201 refers to the table 2051 (refer to FIG. 4) to identify the application information corresponding to the identified type of the tape cassette.

The CPU 201 outputs, to the first communication IC 27, signals respectively indicating the setting information, which is identified based on the signal output from the second communication IC 28 (refer to steps S115 and S123), and the application information corresponding to the tape cassette type, which is identified by the processing at step S129 (step S130). When the first communication IC 27 detects the signals indicating the setting information and the application information, the first communication IC 27 stores the setting information and the application information in the FeRAM 271 (refer to FIG. 3).

A case in which an operation that causes the communication terminal 3 to operate as a reader/writer is performed via the touch panel 34 will be described as an example. The CPU 301 causes an electric current of a predetermined frequency to pass through the first antenna 31 by controlling the first communication IC 37. As a result, an electromagnetic field of a predetermined frequency is output from the first antenna 21.

A case in which an operation that causes the communication terminal 3 to touch the first antenna 21 of the printing device 2 is performed by the user (step S131) is described as an example. The electromagnetic field, which is output from the first antenna 31 of the communication terminal 3, acts on the first antenna 21 of the printing device 2 (step S133). An induced current is induced in the first antenna 21. The induced current drives the first communication IC 27. The first communication IC 27 causes an electric current, which is modulated based on the setting information and the application information respectively stored in the FeRAM 271, to pass through the first antenna 21. An electromagnetic field is output from the first antenna 21.

The electromagnetic field, which is output from the first antenna 21, acts on the first antenna 31 of the communication terminal 3 (step S135). An induced current is induced in the first antenna 31. The first communication IC 37 outputs, to the CPU 301, a signal corresponding to the induced current induced in the first antenna 31. The CPU 301 identifies the setting information and the application information based on the signal output from the first communication IC 37. The CPU 301 outputs, to the second communication IC 38, a signal indicating the identified setting information. When the second communication IC 38 detects the signal indicating the setting information, the second communication IC 38 stores the setting information in the flash ROM 381.

When the first setting information is stored in the flash ROM 281 of the second communication IC 28 in the printing device 2, for example, the same first setting information is also stored in the flash ROM 381 by the above-described processing. As a result, the printing device 2 and the communication terminal 3 can communicate with each other in the WiFi direct mode. Further, when the second setting information (for the AP 4) is stored in the flash ROM 281 of the second communication IC 28 in the printing device 2, for example, the same second setting information (for the AP 4) is also stored in the flash ROM 381 by the above-described processing. As a result, the printing device 2 and the communication terminal 3 can communicate with the AP 4 in the WiFi infrastructure mode.

The CPU 301 identifies the printing application indicated by the identified application information. The CPU 301 determines whether or not the identified printing application is stored in the flash ROM 305. When the CPU 301 determines that the identified printing application is stored in the flash ROM 305, the CPU 301 starts up the identified printing application. Then, a state is obtained in which the user can create and edit the print data using the printing application.

On the other hand, when the CPU 301 determines that the identified printing application is not stored in the flash ROM 305, the following processing is performed to obtain the installation file of the identified printing application from the server 5. The CPU 301 outputs, to the second communication IC 38, a signal indicating request data which request the installation file of the identified printing application. When the second communication IC 38 detects the signal, the second communication IC 38 performs communication with the AP 7 in the WiFi infrastructure mode while using the second setting information (for the AP 7) stored in the flash ROM 381. As a result, the request data are transmitted from the communication terminal 3 to the AP 7 (step S137). The AP 7 receives the request data and transfers the request data to the wired network 6.

The server 5 receives the request data via the AP 7 and the wired network 6. The server 5 transmits the installation file of the printing application corresponding to the request data to the communication terminal 3 via the wired network 6 and the AP 7. The CPU 301 of the communication terminal 3 receives the installation file (step S137). The CPU 301 executes the received installation file to install the printing application. The printing application is stored in the flash ROM 305. The CPU 301 starts up the printing application stored in the flash ROM 305. Then, a state is obtained in which the user can create and edit the print data using the printing application.

A case in which the print data are created and edited by the executed printing application and the communication terminal 3 is operated to cause the printing device 2 to perform printing (step S141) will be described as an example. The CPU 301 stores the created and edited print data in the flash ROM 305. The CPU 301 outputs, to the second communication IC 38, a signal indicating the print data stored in the flash ROM 305. The second communication IC 38 transmits the print data to the printing device 2 using the first setting information or the second setting information (for the AP 4) stored in the flash ROM 305. Specifically, when the first setting information is stored in the flash ROM 305, the second communication IC 38 directly communicates with the printing device 2 in the WiFi direct mode. When the second setting information (for the AP 4) is stored in the flash ROM 305, the second communication IC 38 indirectly communicates with the printing device 2 via the AP 4 in the WiFi infrastructure mode. In either of the cases, a radio wave, which is modulated by the print data, is transmitted from the second antenna 32 of the communication terminal 3 and received by the second antenna 22 of the printing device 2 (step S143). The second communication IC 28 demodulates a signal corresponding to the radio wave received by the second antenna 22 so as to obtain the print data and outputs, to the CPU 301, a signal indicating the print data (step S145). The CPU 301 identifies the print data based on the signal output from the second communication IC 38. The CPU 301 stores the identified print data in the flash ROM 205.

The CPU 201 drives the driver circuits 24 and 25, based on the print data stored in the flash ROM 205, and performs printing using the thermal head 241, the platen roller 252, and the press roller 254 so as to create a label (step S147).

A case in which the power button is operated on the input portion 23 of the printing device 2 to switch off the power supply of the printing device 2 (step S151) will be described as an example. The CPU 201 of the printing device 2 outputs, to the first communication IC 27, a signal indicating the first setting information and the second setting information (for the AP 4) (step S153). When the first communication IC 27 detects the signal indicating the first setting information and the second setting information (for the AP 4), the first communication IC 27 stores the first setting information and the second setting information (for the AP 4) in the FeRAM 271 (refer to FIG. 3). The CPU 201 outputs, to the second communication IC 28, the signal indicating the first setting information and the second setting information (for the AP 4) (step S155). When the second communication IC 28 detects the signal indicating the first setting information and the second setting information (for the AP 4), the second communication IC 28 stores the first setting information and the second setting information (for the AP 4) in the flash ROM 281.

The main processing, which is performed by the CPU 201 of the printing device 2, will be described with reference to FIG. 6 and FIG. 7. When the power button is operated on the input portion 23 to switch on the power supply of the printing device 2 (step S111 (refer to FIG. 5)), the CPU 201 starts performing the main processing by reading and then executing the program stored in the flash ROM 205. The CPU 201 performs initialization processing (step S11). Specifically, the CPU performs the following processing. The CPU 201 drives the driver circuit 24 so that a state is obtained in which an electric current is stopped from passing through the thermal head 241. The CPU 201 drives the driver circuit 25 so that a state is obtained in which the rotating of the platen roller 252 and the press roller 254 is stopped. The CPU 201 clears the RAM 404.

The CPU 201 performs storage processing (refer to FIG. 7) (step S13). The storage processing, which is performed by processing at step S13 (refer to FIG. 6), will be described with reference to FIG. 7. The CPU 201 determines whether or not the type of the tape cassette housed in the cassette housing portion has been identified (step S41). When the storage processing is performed by the processing at step S13, the type of tape cassette has not been identified. The CPU 201 thus determines that the type of the tape cassette has not been identified (no at step S41). The CPU 201 identifies the type of the tape cassette housed in the cassette housing portion via the detection portion 26 (steps S43 and S112 (refer to FIG. 5)). The CPU 201 refers to the table 2051 (refer to FIG. 4) and identifies the application information corresponding to the identified type of the tape cassette as one of "T.!android.com: pkgcom.brother,ptouch.iprintandLabel1." (corresponding to the tape type "laminated," and hereinafter referred to as "App 1"), "T.!android.com:pkgcom.brother,ptouch.iprintandLabel2." (corresponding to the tape type "non-laminated," and hereinafter referred to as "App 2"), and "T.!android.com: pkgcom.brother,ptouch.cableLabel." (corresponding to the tape type "flexible," and hereinafter referred to as "Special App") (step S45). The CPU 201 advances the processing to step S47.

The CPU 201 determines whether or not it is necessary to request the setting information from the second communication IC 28 (step S47). When the storage processing is performed by the processing at step S13, the setting information has not been obtained from the second communication IC 28. The CPU 201 thus determines that it is necessary to request the setting information from the second communication IC 28 (yes at step S47). The CPU 201 requests the setting information from the second communication IC 28 (step S49) by outputting the initialization command signal to the second communication IC 28 (step at S113 (refer to FIG. 5)). The CPU 201 determines whether or not the CPU 201 has detected a signal indicating the second setting information (for the AP 4) which is output from the second communication IC 28 (step S51). When the CPU 201 determines that the CPU 201 has not detected the signal indicating the second setting information (for the AP 4) (no at step S51), the CPU 201 returns the processing to step S51. When the CPU 201 determines that the CPU 201 has detected the signal indicating the second setting information (for the AP 4) (yes at step S51, S115 (refer to FIG. 5)), the CPU 201 identifies the second setting information (for the AP 4) based on the detected signal (step S53). The CPU 201 advances the processing to step S55.

The CPU 201 determines whether or not the power button on the input portion 23 has been operated to switch off the power supply of the printing device 2 (step S55). When the storage processing is performed by the processing at step S13, the power button on the input portion 23 has not been operated to switch off the power supply of the printing device 2. The CPU 201 thus determines that the operation to switch off the power supply has not been performed (no at step S55). The CPU 201 advances the processing to step S59.

The CPU 201 determines whether or not the application information identified by the processing at step S45 is "App 1" (step S59). When the CPU 201 determines that the application information identified by the processing at step S45 is "App 1" (yes at step S59), the CPU 201 outputs, to the first communication IC 27, a signal indicating the second setting information (for the AP 4) identified by the processing at step S53 and the application information of "App 1" identified by the processing at step S45 (steps S61 and S117 (refer to FIG. 5)). The first communication IC 27 stores the second setting information (for the AP 4) and the application information of "App 1" in the FeRAM 271. The CPU 201 terminates the storage processing and returns the processing to the main processing (refer to FIG. 6).

When the CPU 201 determines that the application information identified by the processing at step S45 is not "App 1" (no at step S59), the CPU 201 determines whether or not the application information identified by the processing at step S45 is "App 2" (step S63). When the CPU 201 determines that the application information identified by the processing at step S45 is "App 2" (yes at step S63), the CPU 201 outputs, to the first communication IC 27, a signal indicating the second setting information identified by the processing at step S53 and the application information of "App 2" identified by the processing at step S45 (steps S65 and S117 (refer to FIG. 5)). The first communication IC 27 stores the second setting information (for the AP 4) and the application information of "App 2" in the FeRAM 271. The CPU 201 terminates the storage processing and returns the processing to the main processing (refer to FIG. 6).

When the CPU 201 determines that the application information identified by the processing at step S45 is not "App 2" (no at step S63), the CPU 201 determines whether or not the application information identified by the processing at step S45 is "Special App" (step S67). When the CPU 201 determines that the application information identified by the processing at step S45 is "Special App" (yes at step S67), the CPU 201 outputs, to the first communication IC 27, a signal indicating the second setting information identified by the processing at step S53 and the application information of "Special App" identified by the processing at step S45 (steps S69 and S117 (refer to FIG. 5)). The first communication IC 27 stores the second setting information (for the AP 4) and the application information of "Special App" in the FeRAM 271. The CPU 201 terminates the storage processing and returns the processing to the main processing (refer to FIG. 6).

Figure 6:
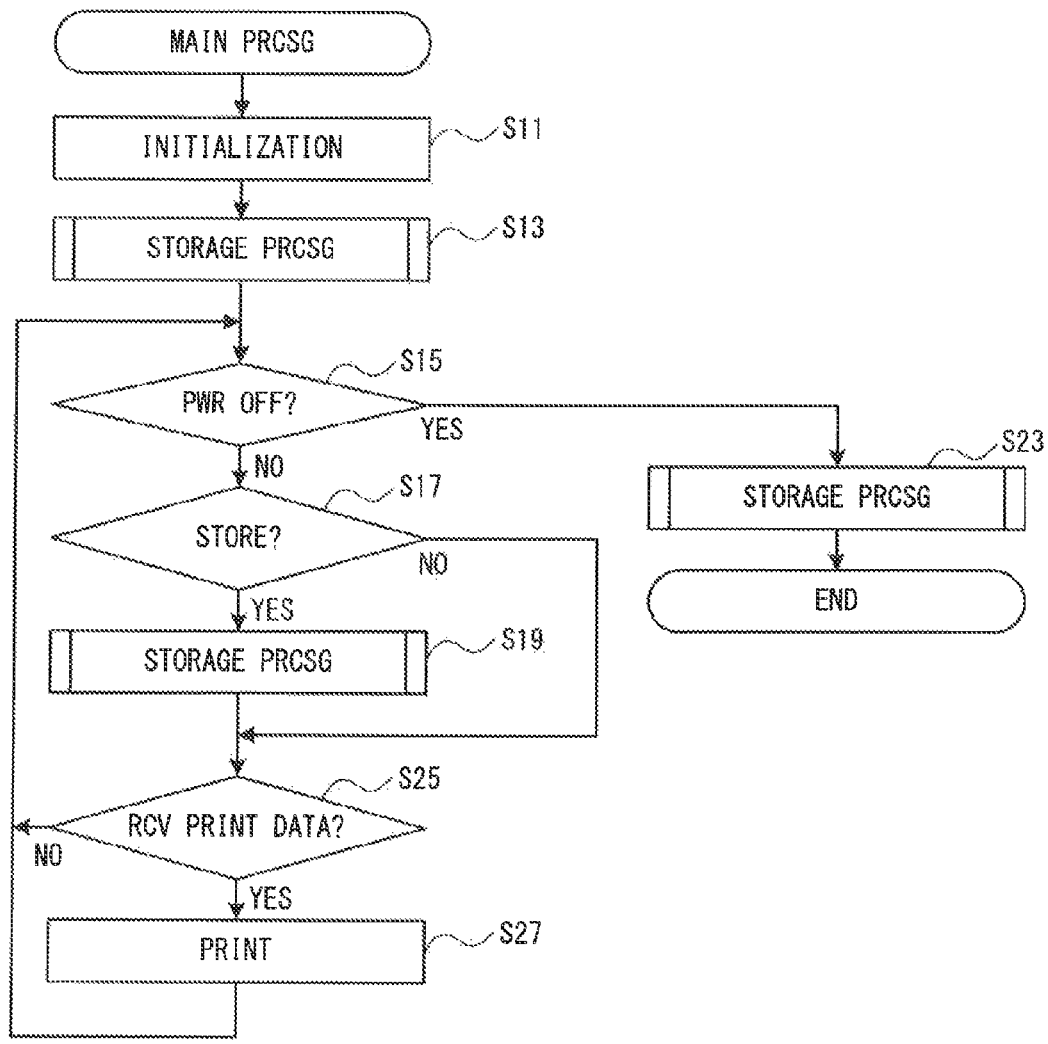
FIG. 6 is a flowchart of main processing.
Figure 7:
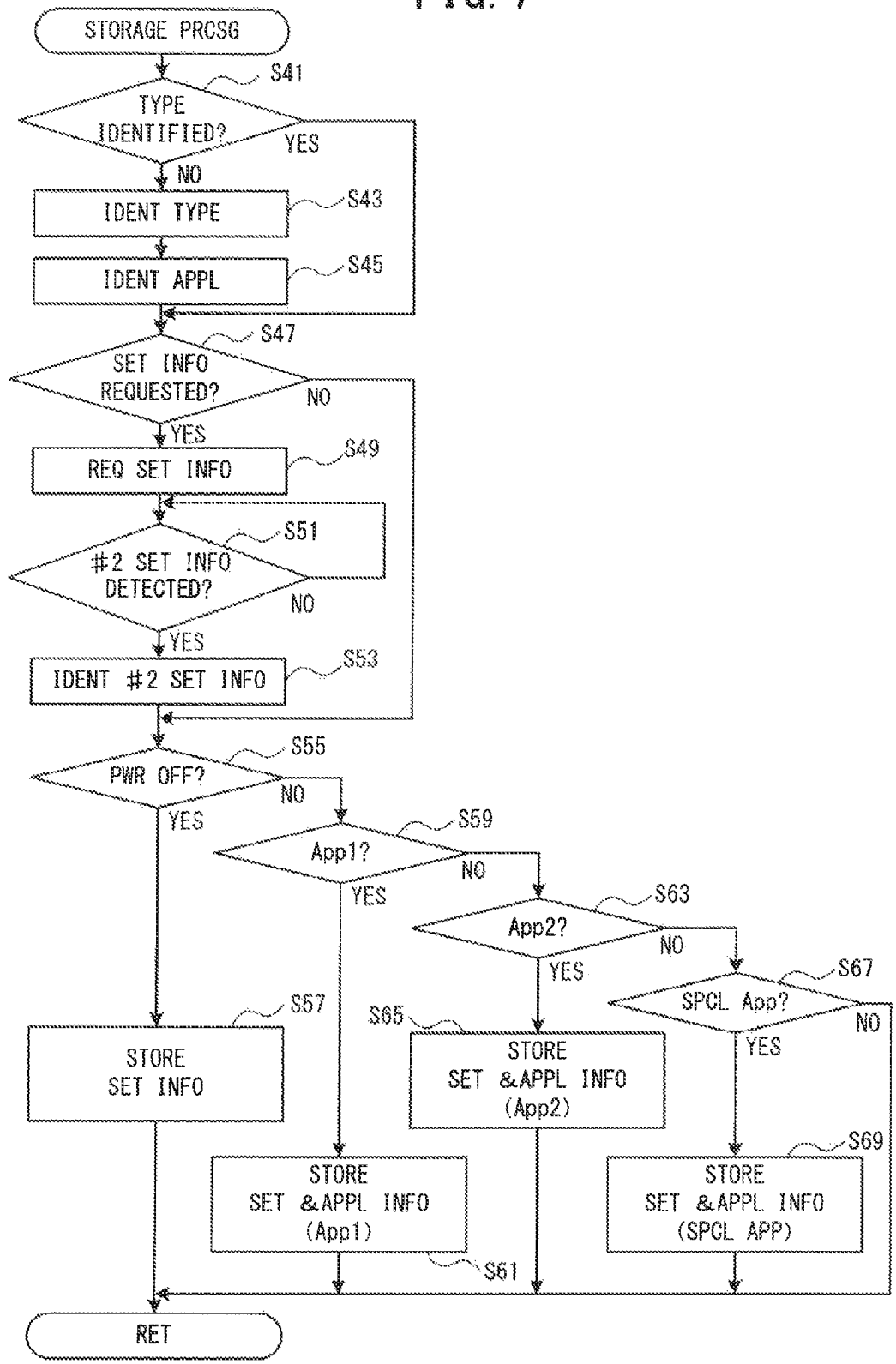
FIG. 7 is a flowchart of storage processing.

When the CPU 201 determines that the application information identified by the processing at step S45 is not "Special App" (no at step S67), the CPU 201 terminates the storage processing and returns the processing to the main processing (refer to FIG. 6).

After terminating the storage processing (step S13), the CPU 201 determines whether or not the operation to switch off the power supply of the printing device 2 has been performed using the power button on the input portion 23 (step S15), as shown in FIG. 6. When the CPU 201 determines that the operation to switch off the power supply of the printing device 2 has not been performed using the power button on the input portion 23 (no at step S15), the CPU 201 determines whether or not the wireless switch button has been operated on the input portion 23 (step S119 (refer to FIG. 5)) or the tape cassette housed in the cassette housing portion has been replaced (step S127 (refer to FIG. 5). When the wireless switch button has not been operated on the input portion 23 and the tape cassette housed in the cassette housing portion has not been replaced, the CPU 201 determines that it is not necessary to perform the storage processing (no at step S17). In this case, the CPU 201 advances the processing to step S25. On the other hand, when the CPU 201 determines that the wireless switch button has been operated on the input portion 23 or the tape cassette housed in the cassette housing portion has been replaced, the CPU 201 determines that it is necessary to perform the storage processing (refer to FIG. 7) and store the setting information and the application information in the FeRAM 271 of the first communication IC 27 (yes at step S17). In this case, the CPU 201 performs the storage processing (refer to FIG. 7) (step S19).

The storage processing, which is performed by the processing at step S19 (refer to FIG. 6), will be described with reference to FIG. 7. The explanation for the same processing as the storage processing performed by the processing at step S13 (refer to FIG. 6) will be omitted or simplified. When the wireless switch button has been operated on the input portion 23 (step S119 (refer to FIG. 5)), the CPU 201 determines that the type of the tape cassette housed in the cassette housing portion has been identified (yes at step S41). Further, the CPU 201 determines that it is necessary to request the setting information from the second communication IC 28 (yes at step S47). The CPU 201 outputs, to the second communication IC 28, a command signal to switch the communication mode (steps S49 and S121 (refer to FIG. 5)). The CPU 201 detects the signal indicating the first setting information or the second setting information (for the AP 4) output from the second communication IC 28 (yes at step S51, step S123

(refer to FIG. 5)). The CPU 201 identifies the first setting information or the second setting information (for the AP 4) based on the detected signal (step S53). The CPU 201 advances the processing to step S55. The CPU 201 performs processing from step 55 to step 59 (step S125 (refer to FIG. 5)). The explanation for the processing from step 55 to step 59 is omitted herein. The CPU 201 returns the processing to the main processing (refer to FIG. 6).

On the contrary, when the tape cassette housed in the cassette housing portion has been replaced (step S127 (refer to FIG. 5)), the CPU 201 determines that the type of the tape cassette has not been identified following the replacement (no at step S41). The CPU 201 identifies the type of the replaced tape cassette via the detection portion 26 (steps S43 and S129 (refer to FIG. 5)). The CPU 201 refers to the table 2051 (refer to FIG. 4) and identifies the application information corresponding to the identified type of the tape cassette as one of "App 1," "App 2," and "Special App" (step S45). The CPU 201 advances the processing to step S47. The CPU 201 determines that it is not necessary to request the setting information from the second communication IC 28 (no at step S47). The CPU 201 advances the processing to step S55. The CPU 201 performs the processing from step 55 to step 59 (step S130 (refer to FIG. 5)). The explanation for the processing from step 55 to step 59 is omitted herein. The CPU 201 returns the processing to the main processing (refer to FIG. 6).

After terminating the storage processing (step S19), the CPU 201 determines whether or not the CPU 201 has received the print data transmitted from the communication terminal 3 (step S25), as shown in FIG. 6. When the CPU 201 determines that the CPU 201 has received the print data transmitted from the communication terminal 3 (yes at step S25, step 145 (refer to FIG. 5)), the CPU 201 stores the received print data in the RAM 204. The CPU 201 performs printing, based on the print data stored in the RAM 204, so as to create a label (steps S27 and S147 (refer to FIG. 5)). The CPU 201 returns the processing to step S15. When the CPU 201 determines that the CPU 201 has not received the print data (no at step S25), the CPU 201 returns the processing to step S15.

When the CPU 201 determines that the operation to switch off the power supply of the printing device 2 has been performed using the power button on the input portion 23 (yes at step S15, S151 (refer to FIG. 5)), the CPU 201 performs the storage processing (refer to FIG. 7) (step S23). The storage processing which is performed by the processing at step S23 will be described with reference to FIG. 7. The explanation for the same processing as the storage processing performed by the processing at steps S13 and S19 (refer to FIG. 6) will be omitted or simplified. When the power button is operated to switch off the power supply, the CPU 201 determines that the type of the tape cassette housed in the cassette housing portion has been already identified (yes at step S41) and it is not necessary to request the setting information from the second communication IC 28 (no at step S47). The CPU 201 determines that the operation to switch off the power supply of the printing device 2 has been performed using the power button (yes at step S55). The CPU 201 outputs, to the first communication IC 27, the signal indicating the first setting information and the second setting information (for the AP 4) (steps 57 and 153 (refer to FIG. 5)). The first communication IC 27 stores the first setting information and the second setting information (for the AP 4) in the FeRAM 271. The CPU 201 outputs, to the second communication IC 28, the signal indicating the first setting information and the second setting information (for the AP 4) (steps 57 and 155 (refer to FIG. 5)). The second communication IC 28 stores the first setting information and the second setting information (for the AP 4) in the flash ROM 281. The CPU 201 returns the processing to the main processing (refer to FIG. 6). The CPU 201 terminates the storage processing (step S23) and then terminates the main processing, as shown in FIG. 6.

As described above, the CPU 201 of the printing device 2 stores the application information (App 1, App 2, or Special App) corresponding to the tape cassette housed in the cassette housing portion in the FeRAM 271 of the first communication IC 27 (steps S61, S65 and S69). As a result, the CPU 201 can cause the communication terminal 3 to obtain the application information using the wireless communication based on the NFC system. Thus, the CPU 301 of the communication terminal 3 can execute an appropriate application corresponding to the type of the tape cassette and can create the print data. Further, the CPU 201 of the printing device 2 can appropriately perform the printing processing based on the print data created as a result of the appropriate application, corresponding to the type of the tape cassette, being executed by the CPU 301.

The printing device 2 stores the first setting information or the second setting information (for the AP 4) in the FeRAM 271 of the first communication IC 27 (steps S61, S65, and S69). As a result, the CPU 201 can cause the communication terminal 3 to obtain the first setting information or the second setting information (for the AP 4). The communication terminal 3 can perform the wireless communication based on the wireless LAN system, based on the obtained first setting information or second setting information (for the AP 4), and can transmit the print data to the printing device 2. Thus, the CPU 201 of the printing device 2 can reliably receive the print data transmitted from the communication terminal 3 and can perform the printing processing.

The CPU 201 refers to the table 2051 and identifies the application information corresponding to the identified type of the tape cassette (step S45). In the table 2051, each of the types of the tape cassette is associated with the application information of the application that can create the print data, which can be used to appropriately perform printing on each of the types of the tape. Thus, by notifying the communication terminal 3 of the application information identified with reference to the table 2051 and causing the communication terminal 3 to execute the corresponding application, the CPU 201 can cause the communication terminal 3 to create the print data which can be used to appropriately perform printing on a target tape.

The first setting information, the second setting information (for the AP 4), and the application information are notified to the communication terminal 3 via the wireless communication based on the NFC system. Thus, by performing a simple operation, that is, causing the communication terminal 3 to touch the first antenna 21 of the printing device 2, the user can cause the communication terminal 3 to execute the application and to create the print data.

It should be noted that the present disclosure is not limited to the above-described embodiment and various modifications can be made thereto. A device to which the present disclosure can be applied is not limited to the printing device 2, but may include other known image forming apparatuses. Specific examples of the image forming apparatus include a printer, a scanner, a facsimile (FAX), a multifunction device, etc. In those cases, the communication terminal 3 may create data, which are used to cause the image forming apparatus to perform processing relating to image formation that can be performed by the image forming apparatus, by executing the application corresponding to the application information obtained via the wireless communication based on the NFC system. For example, a scanner can be used instead of the printing device 2. In this case, the communication terminal 3 may create data, which can be used to display an image scanned by the scanner on the display portion 33, by executing the application corresponding to the application information obtained via the wireless communication based on the NFC system. Alternatively, a FAX can be used instead of the printing device 2, for example. In this case, the communication terminal 3 may create data, which can be used to display an image received by the FAX on the display portion 33, by executing the application corresponding to the application information obtained via the wireless communication based on the NFC system.

In the present embodiment, the setting information and the application information are notified from the printing device 2 to the communication terminal 3 using the wireless communication based on the NFC system. In contrast, the setting information and the application information may be notified from the printing device 2 to the communication terminal 3 using a short-range wireless communication system different from the NFC system (the RFID system, for example). Further, in the present embodiment, the printing device 2 receives the print data, which are transmitted thereto from the communication terminal 3, using the wireless communication based on the wireless LAN system. Alternatively, the printing device 2 may receive the print data, which are transmitted to the printing device 2 from the communication terminal 3, using a wireless communication system different from the wireless LAN system (the Bluetooth (a registered trademark), for example).

In the present embodiment, the first communication IC 27 of the printing device 2 includes the FeRAM 271, and the setting information and the application information, which are stored in the FeRAM 271, are read by the communication terminal 3. The first communication IC 27 need not necessarily include the FeRAM 271. More specifically, the communication terminal 3 may read the setting information and the application information that are stored in a rewritable non-volatile memory provided externally to the first communication IC 27 (the flash ROM 205, for example).

In the present embodiment, each of the types of the tape cassette is associated with the application information in the table 2051. The CPU 201 of the printing device 2 identifies the application information corresponding to the type of the tape cassette housed in the cassette housing portion and notifies the communication terminal 3 of the application information. The CPU 201 may identify the application information in accordance with a state of the printing device 2 other than the type of the tape cassette. For example, the CPU 201 may identify the application information corresponding to a type of the printing device 2 and may notify the communication terminal 3 of the application information. Further, the CPU 201 may identify the application information corresponding to a printing condition input by the user with respect to the printing device 2, for example.

The application information may be a uniform resource locator (URL) that specifies a location of the installation file stored in the server 5. In such a mode, when the application corresponding to the application information is not stored in the flash ROM 305, the CPU 301 of the communication terminal 3 can easily obtain the corresponding installation file by accessing the URL specified by the application information.

The application itself may be stored in the server 5 instead of the installation file. The CPU 301 of the communication terminal 3 may store the application received by the server 5 in the flash ROM 305.

The AP 4 and AP 7 may be provided in an integrated form in the printing system 1 of the present embodiment. More specifically, the AP 4 may be connected to the server 5 via the wired network 6.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image forming apparatus capable of wireless communication with a communication terminal, the image forming apparatus comprising:
   a first communication portion configured to perform wireless communication based on a first standard included in short-range wireless communication standards;
   a second communication portion configured to perform wireless communication based on a second standard, which is different from the first standard;
   a storage portion that stores information, which can be obtained from the image forming apparatus by the communication terminal, as a result of wireless communication being performed with the communication terminal via the first communication portion;
   an image forming portion that performs processing relating to image formation based on data transmitted from the communication terminal to the image forming apparatus; and
   a processor configured to perform processes comprising:
      first storing that stores setting information in the storage portion, the setting information being the information set in the communication terminal to perform communication with the communication terminal via the second communication portion;
      second storing that stores application information in the storage portion, the application information being information that identifies an application which is executed by the communication terminal in accordance with a state of the image forming apparatus, the application information including location information that specifies a location of application data relating to the application; and
      receiving the data transmitted from the communication terminal in accordance with the application being executed in the communication terminal as a result of wireless communication, via the second communication portion, with the communication terminal in which the setting information stored in the storage portion by the first storing is set, the application relating to the application data obtained by the communication terminal from the location specified by the location information.

2. The image forming apparatus according to claim 1, wherein the processor is configured to perform the process further comprising:
   identifying a type of a print medium housed in the image forming apparatus, and
   wherein:
      the second storing includes storing, in the storage portion, the application information that identifies a printing application for creating print data which is to be printed on the identified type of the print medium, the receiving includes receiving the print data created in accordance with the printing application being executed in the communication terminal, and the image forming apparatus performs printing on the identified type of the print medium based on the print data received by the receiving.

3. The image forming apparatus according to claim 2, wherein the second storing includes storing, in the storage portion, the application information of the application, which varies in accordance with the type of the print medium.

4. The image forming apparatus according to claim 1, wherein the first standard is a Near Field Communication (NFC) standard.

5. The image forming apparatus according to claim 1, wherein the second standard is a wireless local area network (LAN) standard.

* * * * *